United States Patent [19]

Yanagi et al.

[11] Patent Number: 5,344,615
[45] Date of Patent: Sep. 6, 1994

[54] WET-PROCESS APPARATUS

[75] Inventors: Motonori Yanagi; Cozy Ban; Takaaki Fukumoto, all of Itami, Japan

[73] Assignee: Mitsubishi Denki Kabushiki Kaisha, Tokyo, Japan

[21] Appl. No.: 136,050

[22] Filed: Oct. 14, 1993

Related U.S. Application Data

[63] Continuation of Ser. No. 844,157, Mar. 2, 1992, abandoned.

[30] Foreign Application Priority Data

Nov. 7, 1991 [JP] Japan .................. 3-291459

[51] Int. Cl.$^5$ .................. B01D 53/34; B01D 50/00
[52] U.S. Cl. .................. 422/170; 422/172; 55/385.2; 454/49; 454/56
[58] Field of Search .............. 422/168, 170, 172, 177; 55/22, 385.2; 454/49, 56, 57

[56] References Cited

U.S. PATENT DOCUMENTS

| | | | |
|---|---|---|---|
| 4,076,504 | 2/1978 | Oshida et al. | 422/177 |
| 4,330,503 | 5/1982 | Allaire et al. | 422/177 |
| 4,433,698 | 4/1984 | Blaul | 134/56 |
| 4,702,829 | 10/1987 | Betz | 422/171 |
| 4,707,341 | 11/1987 | Koch et al. | 422/177 |
| 4,867,949 | 9/1989 | Betz | 422/171 |
| 5,079,045 | 1/1992 | Luhmann | 427/444 |

FOREIGN PATENT DOCUMENTS 3914502 11/1990 Fed. Rep. of Germany .
2211216 8/1990 Japan .

OTHER PUBLICATIONS

Analytical Chemistry vol. 41, No. 12, Oct. 1969; pp. 1708-1709.
Handbuch der Praparativen Anorganischen Chemie.
Methoden der Organischen Chemie.
Chemical Patents Index Documentation Abstracts Journal.

Primary Examiner—Robert J. Warden
Assistant Examiner—Christopher Y. Kim
Attorney, Agent, or Firm—Leydig, Voit & Mayer

[57] ABSTRACT

The present invention provides a wet-processing apparatus comprising a chamber having a working space, means for wet processing in the working space, means for supplying nitrogen gas in fluid communication with the chamber, a nitrogen gas outlet located in a wall of the chamber, means for cleaning nitrogen gas by removing contaminants mixed therewith located in an area of the chamber downstream of the working space and upstream of the nitrogen gas outlet and having a contaminated gas inlet and a treated gas outlet in fluid communication with the chamber, means for diverting gas in the chamber located downstream of the treated gas outlet and upstream of the nitrogen gas supplying means, the means for diverting gas having a first position providing egress of treated gas from the chamber through the nitrogen gas outlet while inhibiting fluid communication to other parts of the chamber and a second position permitting fluid communication and recirculation of the treated gas to other parts of the chamber while preventing egress of the treated gas through the nitrogen gas outlet, and means for circulating nitrogen gas in the chamber.

13 Claims, 4 Drawing Sheets

WET-PROCESS APPARATUS

This application is a continuation of application Ser. No. 07/844,157, filed Mar. 2, 1992, which is abandoned.

BACKGROUND OF THE INVENTION

1. Field of the Invention

This invention relates to a wet-process apparatus and a control method for the same and, in particular, to a wet-process apparatus which is equipped with a function of quickly creating a highly clean space as needed when using chemicals in a clean room, and to a control method for such an apparatus.

2. Description of the Related Art

FIG. 4 is a schematic sectional view of a conventional wet-process apparatus. In the drawing, a wet-process apparatus 1 includes a chamber 2 isolated from the atmospheric air. Provided in the upper section of the chamber 2 is a nitrogen-gas supply pipe 3 for supplying nitrogen gas 4 into the wet-process apparatus 1. The nitrogen gas 4 introduced into the wet-process apparatus 1 through the nitrogen-gas supply pipe 3 is fed to a fine cleaning filter 6 by means of a nitrogen-gas supply fan 5 to become highly clean nitrogen gas 7, which is introduced into a working space 9 separated from atmospheric air by an opening/closing means 8, such as a window or a door that can be opened and closed.

Arranged in the working space 9 is a chemical vessel 11 containing a chemical 10, and, lodged in the chemical vessel 11 are a plurality of semiconductor wafers 13 held by a cassette 12, which can be immersed in and taken out of the chemical vessel 11, and further, transferred to other places, by means of an automatic transfer handle 14. The chemical vessel 11 is supported by a draining board 15 having a large number of holes to allow waste liquid 16 of the chemical 10 to drop therethrough. The waste liquid 16 is discharged through a drain port 17 provided at the bottom of the apparatus.

When the highly clean nitrogen gas 7 is contaminated with mist of the chemical 10, it becomes contaminated nitrogen gas 18, which is discharged to the outside through a gas outlet 19.

An example of such a wet-process clean apparatus for creating a highly clean space as needed when using chemicals in a clean room, is disclosed, for example, in Japanese Patent Laid-Open No. 2-211216.

In the conventional wet-process apparatus 1, constructed as described above, the nitrogen gas 4 supplied through the nitrogen-gas supply pipe 3 is conveyed to the fine cleaning filter 6 by the nitrogen-gas supply fan 5, supplying the working space 9 with highly clean nitrogen gas 7. In the working space 9, the highly clean nitrogen gas 7 flows downwards from above, creating a highly clean nitrogen-gas atmosphere in the space. Further, in this space, the automatic transfer handle 4 carries out the operations of immersing or extracting the cassette 12, containing semiconductor wafers 13, in or out of the chemical 10 and transferring it to some other place.

Insofar as they are transferred through the nitrogen-gas atmosphere, the semiconductor wafers 13 which have been processed with the chemical 10 are free from the formation of a natural oxide film thereon; however, if transferred through air which contains oxygen and water, the wafers cannot avoid the formation of a natural oxide film thereon, adversely affecting the characteristics of the semiconductor devices to be made of these wafers. Accordingly, it is desirable that the wet-process operation be performed in a highly clean nitrogen-gas atmosphere.

On the downstream side of the working space 9, the highly clean nitrogen gas 7 is contaminated with mist of the chemical 10, and is discharged through the gas outlet 19 to the exterior of the system as contaminated nitrogen gas 18. Further, that portion of the chemical 10 which has flowed downwards through the draining board 15, accumulates in the lower section of the wet-process apparatus as waste liquid 16, which is discharged through the drain port 17 to the exterior of the system.

A problem with the conventional wet-process apparatus 1, described above, is that all the nitrogen gas 3 supplied thereto is discharged to the exterior of the system, which means a large quantity of nitrogen gas is required to maintain a nitrogen-gas atmosphere in the working space 9 for a long period of time, resulting in an enormous running cost for the apparatus.

SUMMARY OF THE INVENTION

This invention has been made with a view to solving the above problem; it is accordingly an object of this invention to provide a wet-process apparatus and a control method for the same which help to attain a reduction in running cost and which make it possible to maintain a nitrogen-gas atmosphere of stable nitrogen density for a long period of time.

In order to achieve the above object, according to one aspect of the present invention, there is provided a wet-process apparatus comprising:
 a chamber;
 a wet processing means arranged in this chamber and adapted to perform wet processing;
 a working space in which wet processing is performed by the wet processing means;
 a nitrogen-gas supply means for introducing nitrogen gas into the above-mentioned chamber;
 a nitrogen-gas circulation means for causing the introduced nitrogen gas to circulate in the chamber; and
 a nitrogen-gas cleaning means for cleaning the nitrogen gas by eliminating any contaminant in the nitrogen gas circulating in the chamber.

According to another aspect of the present invention, there is provided a method of controlling a wet-process apparatus, the method comprising the steps of:
 closing an exhaust gas processing section by means of a damper when starting the apparatus so that the gas in this exhaust gas processing section does not circulate in the apparatus and, at the same time, discharging the gas in the apparatus through a gas outlet so as to create a nitrogen-gas atmosphere therein;
 closing both the damper and the gas outlet when the nitrogen-gas density in the apparatus has reached a predetermined value so that nitrogen gas can circulate in the exhaust gas processing section; and
 causing the nitrogen gas in an apparatus chamber to circulate in the exhaust gas processing section to clean this nitrogen gas.

DESCRIPTION OF THE PREFERRED EMBODIMENTS

Figure 1:
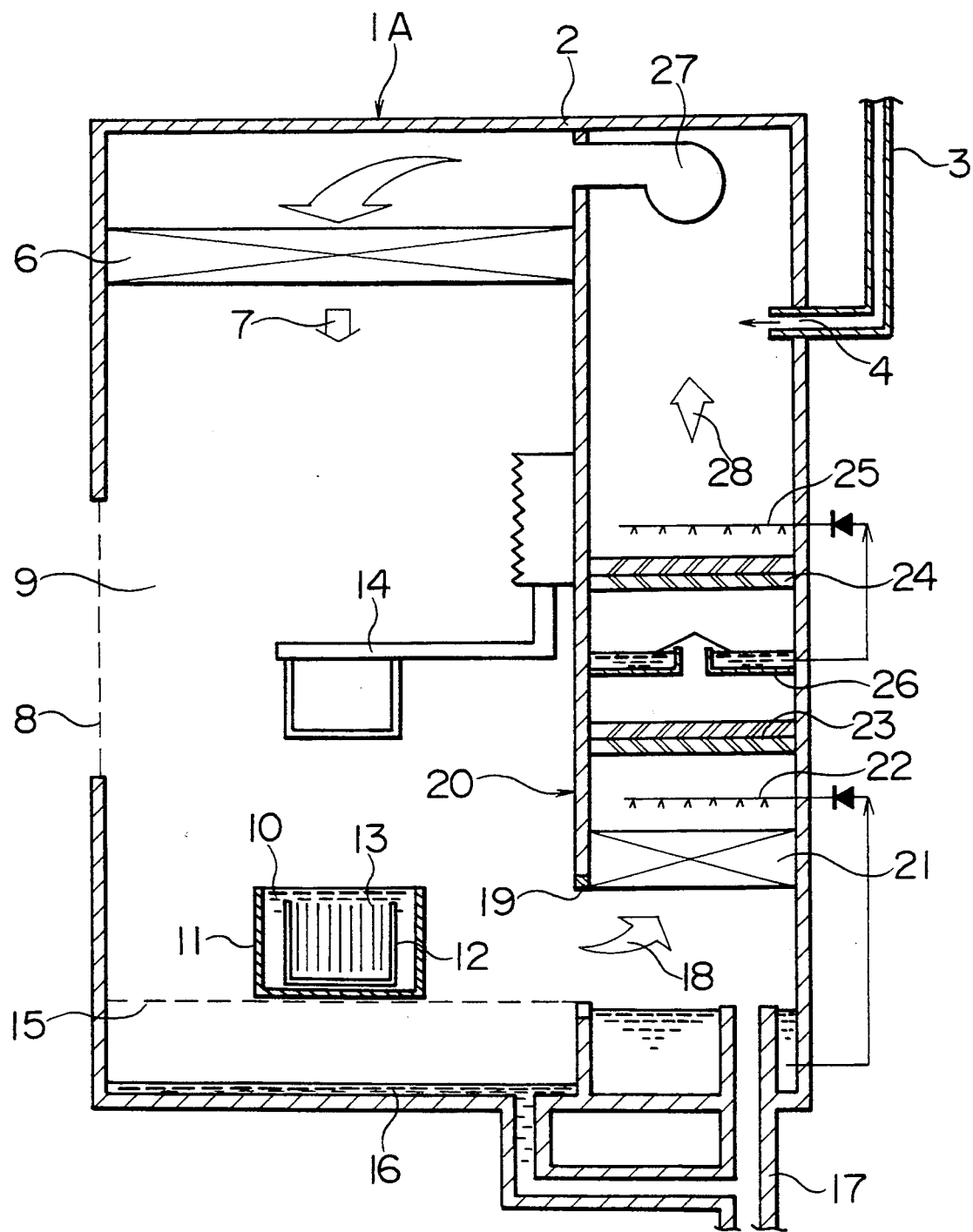
FIG. 1 is a schematic sectional view of a wet-process apparatus in accordance with an embodiment of this invention.

FIG. 1 is a schematic sectional view of a wet-process apparatus in accordance with an embodiment of this invention. In the four accompanying drawings, the same or equivalent components are referred to by the same reference numerals. In FIG. 1, a wet-process apparatus 1A includes a chamber 2, in which is provided an exhaust gas processing section 20 for eliminating the contaminant in contaminated nitrogen gas 18 resulting from contamination from mist of the chemical 10. This exhaust gas processing section 20 is equipped with a gas inlet 19, in which is provided a filler 21 for enlarging gas/liquid contact area. Assuming that the contaminant in the contaminated nitrogen gas 18 is an acid mist, the exhaust gas processing section 20 is robe equipped with: pH-controlling--agent supply nozzles 22 for supplying the contaminated nitrogen gas 18 with a pH-controlling agent to control its pH; demisters 23 and 24, which are gas/liquid contact devices; alkali-aqueous-solution supply nozzles 25 for supplying an alkali-aqueous solution such as NaOH aqueous solution; and an alkali-aqueous reception pan 26 for receiving NaOH aqueous solution or the like in the middle stage of the exhaust gas processing section 20.

In the wet-process apparatus 1A, constructed as described above, a circulation fan 27 serving as the circulation means is provided, which sucks in contaminated nitrogen gas 18 at the gas inlet 19 and conveys the same to the exhaust gas processing section 20. The construction of this exhaust gas processing section 20 varies depending upon the type of contaminant in the contaminated nitrogen gas 18; when, for example, the contaminant is an acid mist, the filler 21 and the NaOH-aqueous-solution reception pan 26, described above, constitute the exhaust gas processing section 20, which then eliminates the acid mist in the contaminated nitrogen gas 18, whereby a clean nitrogen gas 28 is obtained. This clean nitrogen gas 28 is then mixed with the nitrogen gas 4 supplied through the nitrogen-gas supply pipe 3, and is supplied to a fine cleaning filter 6 by the circulation fan 27; by means of the fine cleaning filter, a highly clean nitrogen gas 7 is obtained, which is supplied to a working space 9. Thus, insofar as there is no intrusion of air or the like from the outside, it is possible to create a clean nitrogen-gas atmosphere without continuously feeding nitrogen gas to the apparatus, and it can be maintained in a stable manner if the supply of nitrogen-gas from the outside is stopped.

The changes with time in the nitrogen density of the clean nitrogen gas supplied to the working space 9 of the wet-process apparatus 1A of the above embodiment of this invention were compared with those in the conventional wet processing device 1. In both cases, the area of the fine cleaning filter 6 through which the cleaned nitrogen gas was blown out was 1 m(width)×0.8 m(depth); and the blowing velocity of the nitrogen gas was 0.5 m/min. Further, in the case of this embodiment, in which nitrogen gas 4 is caused to circulate in the wet-process apparatus by means of the circulation fan 27, the volume of the apparatus portion in which the nitrogen gas 4 circulated was 1 m(width)×1 m(depth)×1 m(height)=1 $m^3$. The purity of the nitrogen gas 4 supplied was 99.999% or more; and the target purity of the cleaned nitrogen gas was 99% or more.

In the case of the conventional apparatus, the clean nitrogen gas supplied to the working space 9 attained a purity of 99% or more almost immediately after the supply of nitrogen gas 4 was started, creating a highly clean atmosphere in the space. The nitrogen gas 4, however, had to be supplied continuously at a rate of not less than 24 $m^3$/min.

Figure 2:
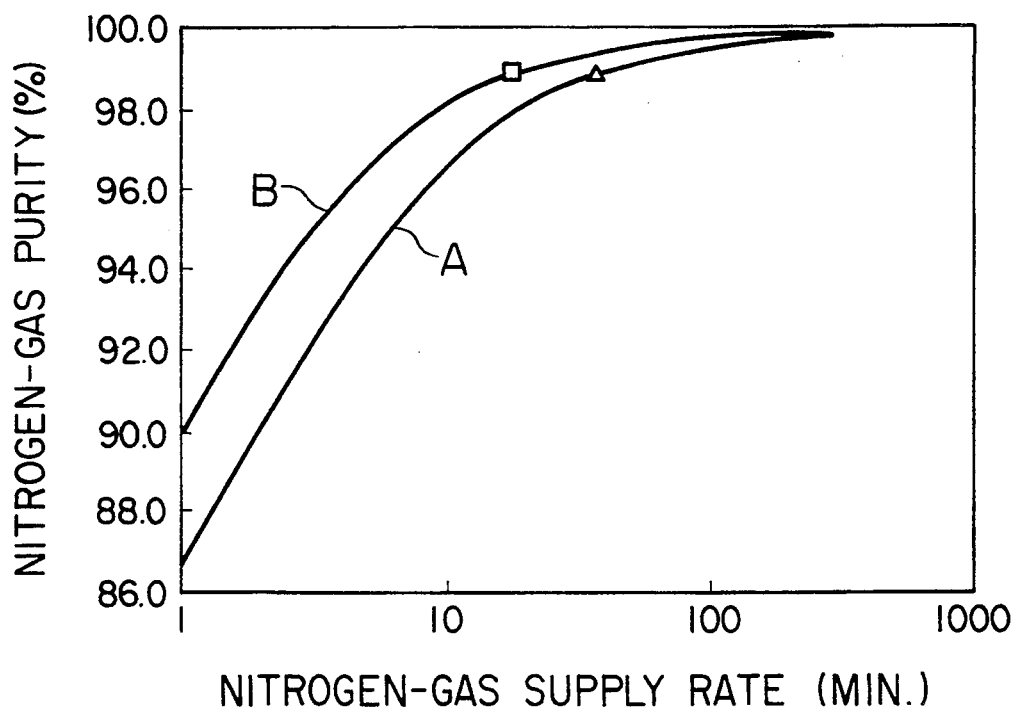
FIG. 2 is a chart showing the results of an experiment carried out by using a wet-process apparatus in accordance with an embodiment of this invention.

Regarding the apparatus of the above embodiment of this invention, the nitrogen gas 4 was supplied at a rate of 0.5 $m^3$/min. and then, at a rate of 1 $m^3$/min., and an examination was carried out on both cases. The chart of FIG. 2 shows the changes with time in the nitrogen-gas density (purity) in the working space in these two cases. In the drawing, the curve A represents the case where the nitrogen gas 4 was supplied at the rate of 0.5 $m^3$/min., and the curve B represents the case where it was supplied at the rate of 1 $m^3$/min. As shown in FIG. 2, it took approx. 35 minutes at the nitrogen-gas supply rate of 0.5 $m^3$/min,. and approx. 18 minutes at the rate of 1 $m^3$/min., for the cleaned nitrogen gas to attain a purity of 99% or more. The amount of nitrogen gas 4 consumed to create a nitrogen-gas atmosphere in the working space 9 at the same cleanliness level as that of the conventional apparatus was approx. 1/50 at the nitrogen-gas supply rate of 0.5 $m^3$/min., and approx. 1/25 at the rate of 1 $m^3$/min., as compared to that of the conventional apparatus.

Figure 3:
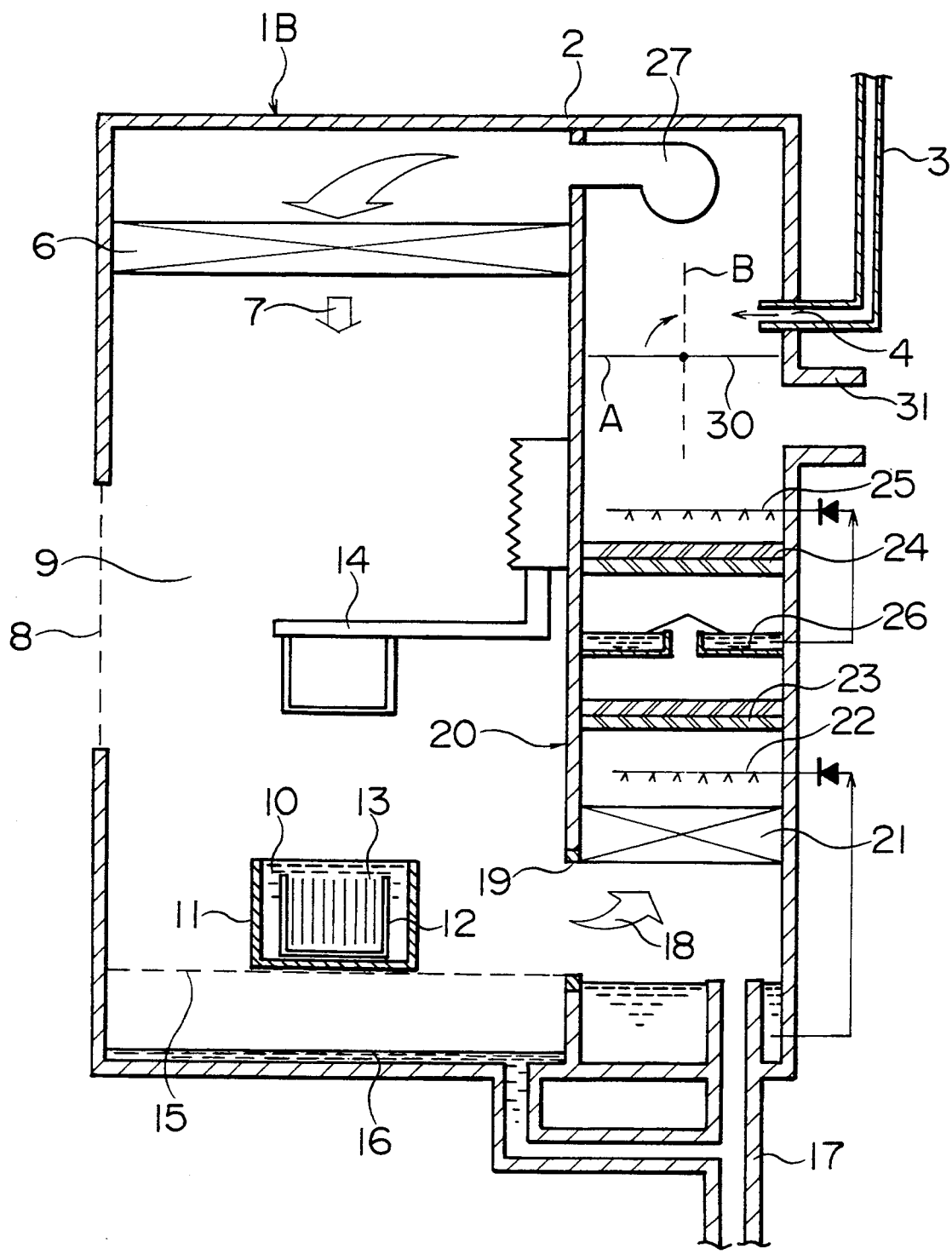
FIG. 3 is a schematic sectional view of a wet-process apparatus in accordance with another embodiment of this invention.
Figure 4:
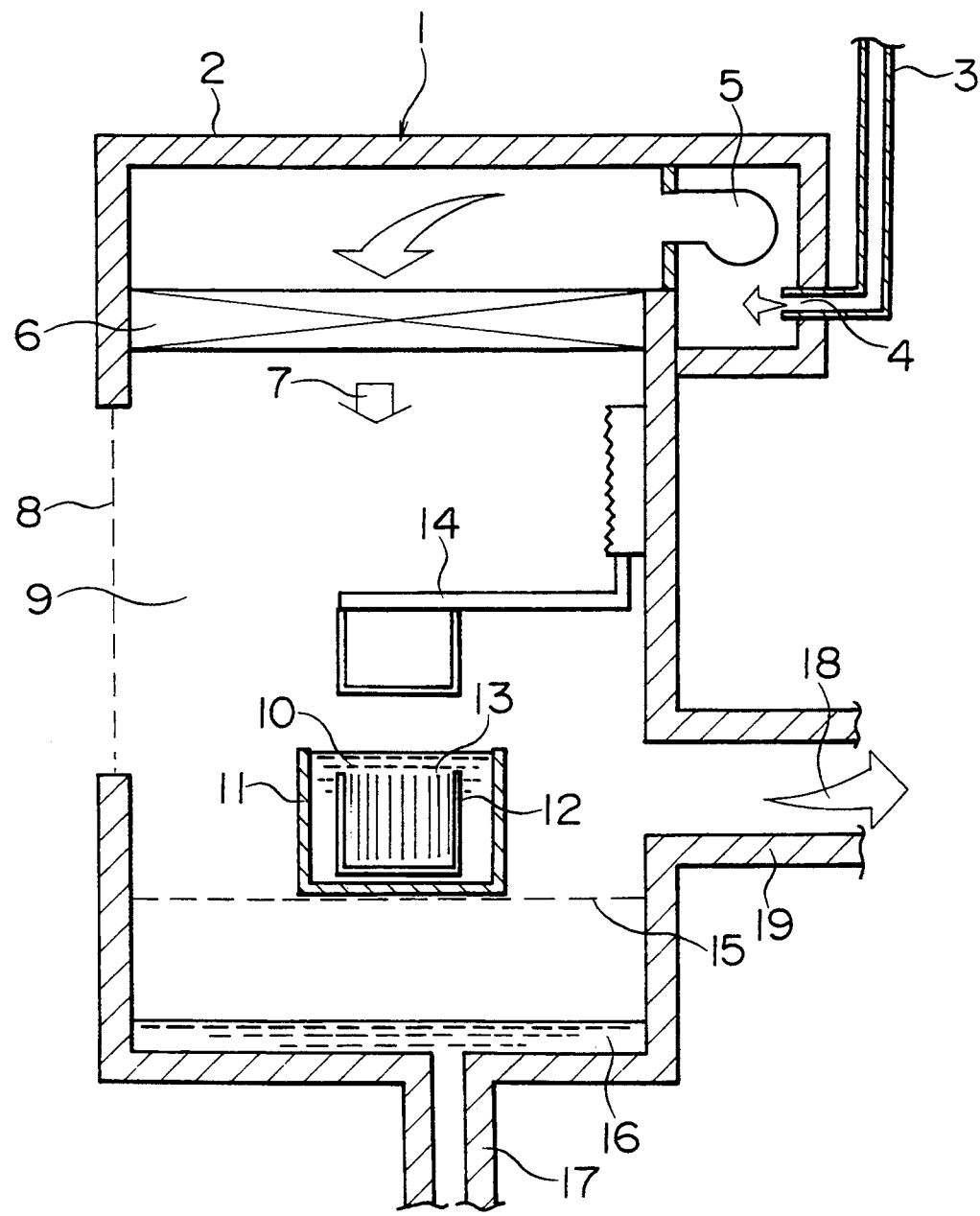
FIG. 4 is a schematic sectional view of a conventional wet-process apparatus.

FIG. 3 is a schematic sectional view of a wet-process apparatus 1B in accordance with another embodiment of this invention. In the drawing, the wet-process apparatus 1B is equipped with a switching damper 30 and a gas outlet 31.

When starting the wet-process apparatus 1B, the damper 30 is first closed as indicated at A in the drawing so as to prevent the gas in the exhaust gas processing section 20 from circulating in the apparatus, and the nitrogen gas 4 supplied by the circulation fan 27 is allowed to circulate in the apparatus; the gas which has been in the apparatus is discharged through the gas outlet 31. This arrangement makes it possible to create a nitrogen-gas atmosphere quickly in the wet-process apparatus 1B. When the density of the nitrogen gas 4 in the apparatus has reached a predetermined value, the gas outlet 31 is closed by an opening/closing or closure means (not shown) and, at the same time, the damper 30 is opened, i.e., switched to the position B, so that the gas in the exhaust gas processing section 20 can circulate in the apparatus. In this condition, the same operation as that described above is performed to cause nitrogen gas 4 to circulate in the apparatus, whereby it is possible to maintain a nitrogen-gas atmosphere in the apparatus with a small amount of nitrogen gas. Further, with this control method, it is possible, for example, to create a nitrogen-gas atmosphere of a desired density in several tens of seconds after the wet-process apparatus 1B is started.

While in the above-described embodiments a means for supplying high-purity nitrogen gas was employed for the purpose of creating a nitrogen-gas atmosphere in the working space 9, the same effect can be obtained by extracting exclusively nitrogen from circulating air by means of a nitrogen-film separation device or an adsorption separation device and supplying the nitrogen thus obtained to the apparatus again. Also in that case, the same effect in terms of running cost can be expected when the amount of nitrogen gas extracted and supplied to the apparatus is the same as in the above embodiments.

Further, while the above embodiments were described with reference to the case where the contaminant in the contaminated nitrogen gas 18 was an acid mist, the present invention is also applicable to other types of contaminant.

As described above, it is possible, with the present invention, to drastically reduce the consumption of nitrogen gas, so that a substantial reduction in running cost can be attained; further, a nitrogen-atmosphere of stable density can be maintained in the apparatus for a long period of time. Further, when starting the apparatus, the gas in the apparatus can be quickly replaced by nitrogen gas to create a nitrogen gas atmosphere of a predetermined density in a short time, and, subsequently, the nitrogen gas in the apparatus is processed in the exhaust gas processing section to become clean nitrogen gas.

What is claimed is:

1. A wet-processing apparatus comprising:
   a chamber, having:
   a working space;
   means for wet processing in said working space;
   means for supplying nitrogen gas in fluid communication with said chamber;
   a nitrogen gas outlet located in a wall of said chamber;
   means for cleaning nitrogen gas by removing contaminants mixed therewith located in an area of said chamber downstream of said working space and upstream of said nitrogen gas outlet and having a contaminated gas inlet and a treated gas outlet in fluid communication with said chamber;
   means for diverting gas in the chamber located downstream of said treated gas outlet and upstream of said nitrogen gas supplying means, said means for diverting gas having a first position providing egress of treated gas from said chamber through said nitrogen gas outlet while inhibiting fluid communication to other parts of said chamber and a second position permitting fluid communication and recirculation of said treated gas to other parts of said chamber while preventing egress of said treated gas through said nitrogen gas outlet; and
   means for circulating nitrogen gas in said chamber.

2. An apparatus as claimed in claim 1 wherein said nitrogen-gas cleaning means includes a pH-control element including, in series, a filler for maximizing gas/liquid contact area, a nozzle member for supplying a pH-controlling agent, and a demister, and an aqueous-alkali-solution supply means for cleaning acid mist from the nitrogen gas.

3. An apparatus as claimed in claim 2 where said nitrogen-gas cleaning means further includes a plurality of nozzle members and a pH-controlling solution reception pan located under said nozzle members to collect said solution.

4. An apparatus as claimed in claim 1 where said nitrogen gas circulation means is a fan.

5. An apparatus as claimed in claim 1 further including a cleaning filter located within said chamber downstream of and in fluid communication with said nitrogen gas circulating means.

6. An apparatus as claimed in claim 1 wherein said nitrogen gas circulating means is in fluid communication with said nitrogen gas cleaning means.

7. An apparatus as claimed in claim 1 wherein said nitrogen gas circulating means is in fluid communication with said contaminated gas inlet.

8. An apparatus as claimed in claim 1 wherein said nitrogen gas circulating means is in fluid communication with said nitrogen gas supplying means.

9. An apparatus as claimed in claim 1 wherein said means for diverting gas comprises valve means.

10. An apparatus as claimed in claim 1 wherein said valve means includes a damper.

11. An apparatus as claimed in claim 10 wherein said damper is located intermediate said nitrogen gas outlet and said means for supplying nitrogen.

12. An apparatus as claimed in claim 1 wherein said nitrogen gas outlet includes a closure device.

13. An apparatus as claimed in claim 1 wherein said means for gas diverting arrangement includes a closure device in said outlet and a damper located intermediate said nitrogen gas outlet and said means for supplying nitrogen gas.

* * * * *

UNITED STATES PATENT AND TRADEMARK OFFICE
CERTIFICATE OF CORRECTION

PATENT NO. : 5,344,615
DATED      : September 6, 1994
INVENTOR(S) : Yanagi et al.

It is certified that error appears in the above-indentified patent and that said Letters Patent is hereby corrected as shown below:

Column 6, line 43, change "gas diverting arrangement" to --diverting gas--.

Signed and Sealed this

Twenty-seventh Day of December, 1994

Attest:

BRUCE LEHMAN

*Attesting Officer*    *Commissioner of Patents and Trademarks*